UNITED STATES PATENT OFFICE.

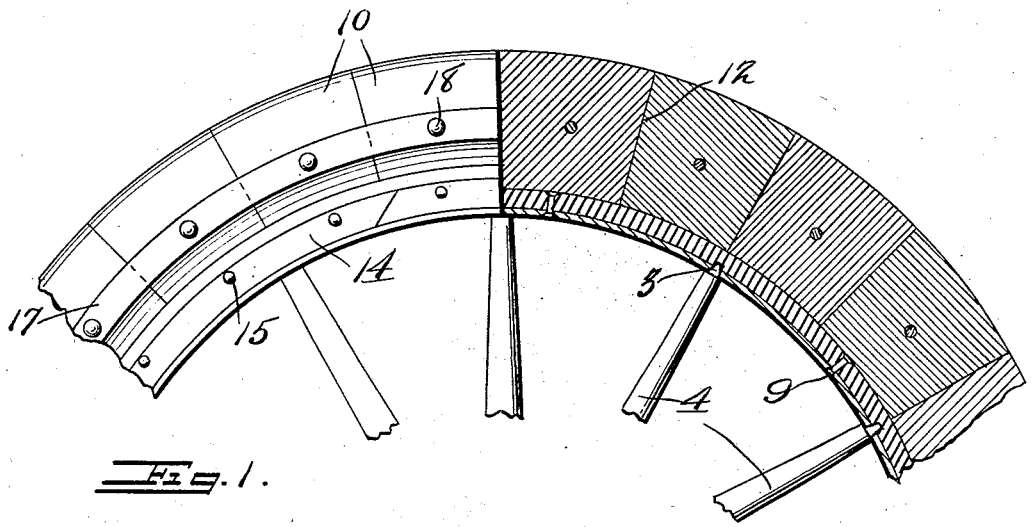

FREDRICH ROMAIN, OF MARIAS, MONTANA.

TIRE.

1,197,765.  Specification of Letters Patent.  Patented Sept. 12, 1916.

Application filed December 30, 1914. Serial No. 879,765.

*To all whom it may concern:*

Be it known that I, FREDRICH ROMAIN, a citizen of the United States, residing at Marias, in the county of Chouteau and State of Montana, have invented certain new and useful Improvements in Tires, of which the following is a specification.

My invention relates to a tire for vehicles.

The primary object of my invention resides in the provision of an improved resilient supporting means for a solid segmental tire, the resilient means being novelly supported on the vehicle rim.

Another object of my invention resides in the provision of an improved bracing means removably associated with the outer surface of the segmental tire for holding the same at all times in a proper position upon the rim and preventing the accidental displacement of one or all of the segments.

A further object of my invention resides in the construction of an improved rim for a vehicle wheel, the latter having novel means formed thereon for receiving the resilient supporting means and also has associated therewith improved means for facilitating the quick removal of the resilient means as well as the segmental tire.

A still further object of my invention resides in the construction of the segmental tire which includes a plurality of blocks, the latter having portions of their side surfaces complemental with the inner surfaces of the resilient means, which is preferably channel shaped so as to afford a substantially even connection when the same is positioned within the resilient means and also prevent lateral movement of the blocks, forming the tire, with respect to the vehicle rim.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:—Figure 1 is a fragmentary side elevational view of my invention, partly in longitudinal section, showing to advantage the manner of mounting the blocks forming the tire; Fig. 2 is an enlarged fragmentary transverse sectional view taken through the device showing to advantage the novel construction of the resilient means and tire; and Fig. 3 is a side elevational view of one of the retaining or bracing means.

Referring more particularly to the drawings in which similar reference numerals designate like or corresponding parts throughout the different views, I provide in this instance a vehicle rim 1, formed preferably of steel or other desirable material with a plurality of openings 2 in which are disposed the reduced ends 3 of a plurality of spokes 4 which support the rim. Formed integral with and extending laterally from one edge of the rim 1 is an annular flange 5 which constitutes a suitable support or retaining means for my improved resilient supporting means disposed on the rim. The supporting means in this instance consists essentially of a circumferential channel member 6, formed preferably of rubber, the inner surfaces of the sides 7 of which are curved gradually toward the outer surfaces thereof as at 8 for a purpose to be hereinafter described. Suitable fastening devices 9 are employed to rigidly hold the base of the channel member 6 in abutting relation with the outer surface of the rim 1.

Disposed in the channel member 6 is my improved tire which in this instance embodies a plurality of segments or blocks 10, formed preferably, but not necessarily of wood. Each of these blocks 10 is substantially circular in cross section and has projections 11 extending from a portion of the outer periphery thereof and which constitute bases for supporting the blocks in circumferental alinement with the channel member, the outer sides of the blocks being complementally curved with respect to the curved surfaces 8 of the sides 7 so as to provide an efficient bearing and one that will prevent the transverse movement of the blocks with respect to the rim and will further facilitate the resilient supporting of the sections in the event that the wheels of the vehicle, when rounding curves, are disposed at an angle less than a right angle to the ground. The ends of the blocks are tapered as at 12 and arranged in abutting relation with the end of the adjacent block, this arrangement facilitating the removal of one of the blocks when desired and also the positioning of the blocks in circumferential alinement with each other and with respect to the rim.

In order to removably hold the channel member 6 and the blocks 10 in the proper position upon the rim 1, I have provided a groove 13 on the upper surface adjacent the free edge of the rim 1 to receive a split ring 14, which ring is arranged in abutting relation with the outer surface of one of the sides 7 of channel member 6 and held in this position by means of a plurality of bolts 15 which extend transversely through the inner ends of the blocks and the sides 7. Nuts 16 are removably engaged upon the opposite ends of the bolts for clamping the ring 14 to the flange 5.

For the purpose of bracing the blocks 10 and holding the same in proper position, I have found it expedient to flatten the respective side edges of each of the blocks and secure annular rings 17 thereon by means of bolts 18 which extend through openings 19 in the rings and through the transverse openings in each of the blocks, the free ends of the bolts being engaged by nuts 20 for clamping the parts in substantial rigid relation.

Although I have shown and described the preferred embodiment of my invention, I desire to be understood that I am not to be limited to the exact details shown, however, great stress is laid upon the construction and arrangement of the resilient channel member for receiving the segmental tire and the improved vehicle rims provided with means for removably holding the parts in position.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:—

A tire including in combination with a rim and a flange extending from one edge thereof, a plurality of non-resilient blocks having tapered inner ends, a resilient channel member supported on the rim for receiving blocks, the inner surface of the sides of the channel member being gradually curved to the outer surface so as to conform to the sides of the blocks, means for fastening the blocks together, fastening means mounted on the rim and coöperating with the flange for bracing the channel member, and the outer sides of the channel member extending beyond the outer edge of the flange and the last mentioned fastening means to prevent transverse movement of the blocks with respect to the rim and to facilitate the resilient supporting of the blocks when side strain is disposed on the blocks.

In testimony whereof I affix my signature in presence of two witnesses.

FREDRICH ROMAIN.

Witnesses:
  C. J. HILDEBRAND,
  M. E. BRANDT.